United States Patent
Lee et al.

(10) Patent No.: US 9,398,560 B2
(45) Date of Patent: Jul. 19, 2016

(54) METHOD FOR PERFORMING PAGING IN WIRELESS COMMUNICATION SYSTEM SUPPORTING DIRECT COMMUNICATION BETWEEN TERMINALS, AND D2D TERMINAL FOR THE METHOD

(71) Applicant: LG ELECTRONICS INC., Seoul (KR)

(72) Inventors: Eunjong Lee, Anyang-si (KR);
Hyeyoung Choi, Anyang-si (KR);
Heejeong Cho, Anyang-si (KR);
Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 14/406,734

(22) PCT Filed: Jun. 10, 2013

(86) PCT No.: PCT/KR2013/005071
§ 371 (c)(1),
(2) Date: Dec. 9, 2014

(87) PCT Pub. No.: WO2013/187643
PCT Pub. Date: Dec. 19, 2013

(65) Prior Publication Data
US 2015/0119088 A1 Apr. 30, 2015

Related U.S. Application Data

(60) Provisional application No. 61/657,879, filed on Jun. 10, 2012.

(51) Int. Cl.
*H04W 88/02* (2009.01)
*H04W 88/18* (2009.01)
(Continued)

(52) U.S. Cl.
CPC .................................... *H04W 68/02* (2013.01)

(58) Field of Classification Search
CPC ......... H04W 8/005; H04W 8/08; H04W 8/14; H04W 8/20; H04W 8/04; H04W 8/041; H04W 8/043; H04W 84/12; H04W 72/04; H04W 72/042; H04W 72/0446; H04W 72/0443; H04W 72/044; H04W 72/048; H04W 72/0486; H04W 72/0493; H04W 72/06; H04W 72/08; H04W 72/082; H04W 72/085; H04W 72/087; H04L 67/1044; H04L 67/104; H04L 67/1002
USPC ......... 370/311, 318, 321, 326, 328, 337, 338, 370/347; 455/426.1, 458, 464, 515
See application file for complete search history.

(56) References Cited

U.S. PATENT DOCUMENTS 7,142,520 B1 * 11/2006 Haverinen ............ H04W 68/00
370/311
(Continued)

FOREIGN PATENT DOCUMENTS

KR   10-2008-0092442   10/2008
KR   10-2010-0029848   3/2010
(Continued)

OTHER PUBLICATIONS

PCT International Application No. PCT/KR2013/005071, Written Opinion of The International Searching Authority dated Sep. 30, 2013, 28 pages.

*Primary Examiner* — Olumide T Ajibade Akonai
*Assistant Examiner* — Ki Ha Nam
(74) *Attorney, Agent, or Firm* — Lee, Hong, Degerman, Kang & Waimey; Jonathan Kang; Harry Lee

(57) ABSTRACT

A method of performing paging by a first D2D terminal in a wireless communication system supporting D2D communication includes: obtaining information on a paging slot, the paging slot being designated to be dedicated to the first D2D terminal for the D2D communication and including a plurality of paging sections; monitoring whether a signal for the first D2D terminal is transmitted in a first paging section in the obtained paging slot through a region assigned to the first D2D terminal; monitoring whether a paging request message is transmitted in a paging region only for the first D2D terminal in a second paging section if the signal is detected; and transmitting a paging response message through a third paging section to the second D2D terminal that transmits the paging request signal, as a response to the paging request message, if the paging request message is detected.

16 Claims, 8 Drawing Sheets

(51) Int. Cl.
*H04W 48/16* (2009.01)
*H04W 68/02* (2009.01)

(56) References Cited

U.S. PATENT DOCUMENTS

2008/0186895 A1* 8/2008 Shang ............... H04L 29/06
370/312
2009/0005057 A1* 1/2009 Lee .................. H04W 16/14
455/450
2009/0013081 A1 1/2009 Laroia et al.
2012/0155410 A1* 6/2012 Toskala ............. H04W 76/023
370/329
2012/0155441 A1* 6/2012 Rousseau ........... H04W 84/18
370/337

FOREIGN PATENT DOCUMENTS

| KR | 10-2010-0038225 | 4/2010 |
| WO | 2011/123510 | 10/2011 |

* cited by examiner (a) (b)

FIG. 8
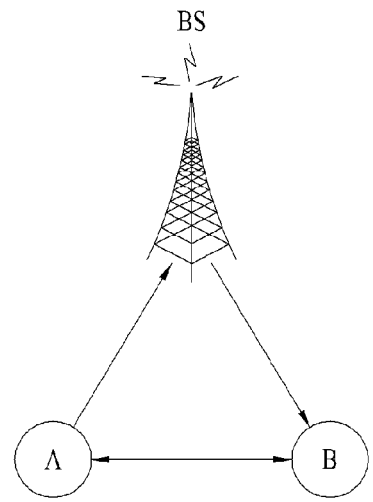
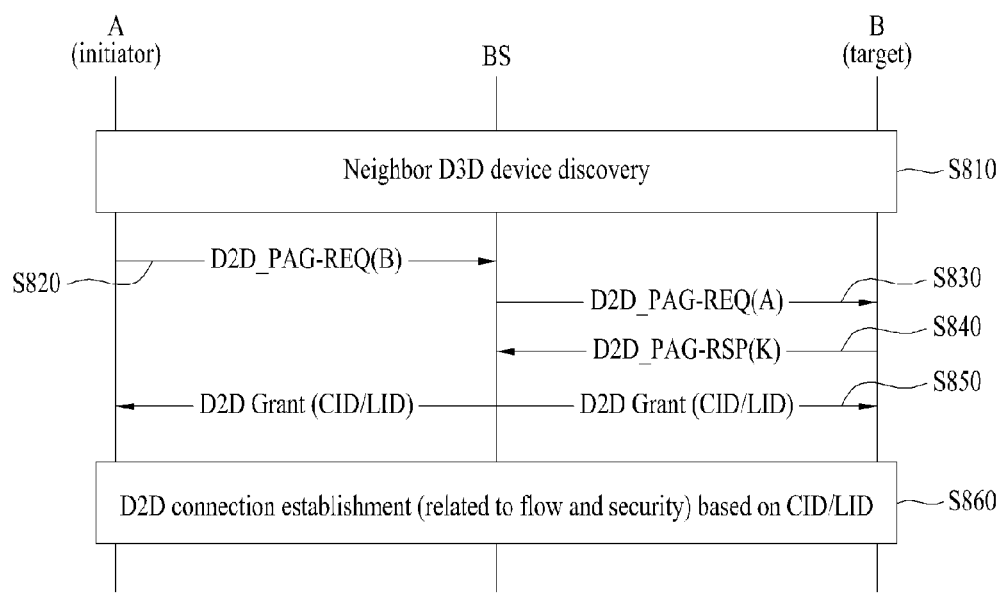

METHOD FOR PERFORMING PAGING IN WIRELESS COMMUNICATION SYSTEM SUPPORTING DIRECT COMMUNICATION BETWEEN TERMINALS, AND D2D TERMINAL FOR THE METHOD

CROSS-REFERENCE TO RELATED APPLICATIONS

This application is the National Stage filing under 35 U.S.C. 371 of International Application No. PCT/KR2013/005071, filed on Jun. 10, 2013, which claims the benefit of U.S. Provisional Application Ser. No. 61/657,879, filed on Jun. 10, 2012, the contents of which are hereby incorporated by reference herein in their entirety.

TECHNICAL FIELD

The present invention relates to a wireless communication, and more particularly, to a method of performing paging in a wireless communication system supporting direct communication between user equipments and a D2D user equipment for the same.

BACKGROUND ART

Recently, as smartphones and tablet PCs are widely used and multimedia communications of high capacity are activated, mobile traffic increases rapidly. The increasing tendency of the mobile traffic in the future is expected to increase about twice each year. Since most of the mobile traffic is transmitted through a base station, communication service providers are currently confronted with serious network overloads. In order to handle the increasing traffic, the communication service providers increase network equipment investment and commercialize the next generation mobile communication standards (e.g., WiMAX, LTE (long term evolution), etc.) for efficiently handling lots of traffic in a hurry. Yet, in order to bear the amount of traffic expected to increase further rapidly, it is time to seek for other solutions.

D2D (device-to-device) communication is a distributive communication technology for directly delivering traffic between adjacent nodes without using such an infrastructure as a base station. In D2D communication environment, each node such as a mobile terminal and the like searches for another user equipment physically adjacent to the corresponding node by itself, establishes a communication session, and then transmits traffic. Thus, since the D2D communication can solve the traffic overload problem in a manner of distributing the traffic focused on a base station, the D2D communication is spotlighted as an elementary technology of the post 4G next generation mobile communication. Such a standardization organization as 3GPP, IEEE and the like is promoting D2D communication standard enactment based on LTE-A or Wi-Fi. And, such a company as Qualcomm and the like is developing an independent D2D communication technology.

In a D2D system, a paging step is performed to transceive data between D2D user equipments. When the paging is performed, unnecessary paging between the D2D user equipments may cause power consumption and inefficiency of a system resource. Yet, solutions for the aforementioned problems, which occur when a D2D user equipment performs paging, are not proposed yet.

DISCLOSURE OF THE INVENTION

Technical Tasks

One technical task intended to achieve by the present invention is to provide a method for a D2D user equipment to perform paging in a wireless communication system supporting D2D (device to device) communication between user equipments according to one embodiment of the present invention.

Another technical task intended to achieve by the present invention is to provide a method for a D2D user equipment to perform paging in a wireless communication system supporting D2D (device to device) communication between user equipments according to a different embodiment of the present invention.

Another technical task intended to achieve by the present invention is to provide a D2D user equipment performing paging in a wireless communication system supporting D2D (device to device) communication according to one embodiment of the present invention.

The other technical task intended to achieve by the present invention is to provide a D2D user equipment performing paging in a wireless communication system supporting D2D (device to device) communication according to a different embodiment of the present invention.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing paging, which is performed by a first D2D UE in a wireless communication system supporting a device to device (D2D) communication includes the steps of obtaining information on a paging slot, the paging slot is designated for the first D2D UE only and contains a plurality of paging intervals for the D2D communication, monitoring whether a signal for the first D2D UE is transmitted via a region assigned for the first D2D UE in a first paging interval in the obtained paging slot, if the signal is detected, monitoring whether a paging request message is transmitted in a paging region dedicated to the first D2D UE in a second paging interval and, if the paging request message is detected, transmitting a paging response message to a second D2D UE, which has transmitted the paging request signal, via a third paging interval in response to the paging request message. The method can further include the step of receiving the information on the paging slot designated for the first D2D UE only from a base station via a broadcast message, a multicast message or a unicast message.

The step of obtaining the information on the paging slot designated for the first D2D UE only can further include the step of determining an index of the paging slot based on a time unit index to which the first D2D UE is assigned in a discovery interval and a number of paging slots included between D2D discovery slots. Or, the step of obtaining the information on the paging slot designated for the first D2D UE only can further include the step of determining an index of the paging slot based on a paging slot offset value and a number of slots included between D2D discovery slots. The paging request message includes an identifier of the first D2D UE transmitting the paging request message, a candidate connection identifier (CID) list or a candidate link identifier (LID) list, The paging response message can include a CID or an LID selected from the candidate CID list or the candidate LID list. The method can further include the steps of performing a connection establishment based on the selected CID or the LID and directly transceiving data with the second D2D UE, which has transmitted the paging request message. The second paging interval corresponds to a paging request interval and the third paging interval may correspond to a paging response interval. The first paging interval corresponds to a fast paging interval and the region assigned for the first D2D UE may correspond to a single tone corresponding to an identifier of the first D2D UE.

To further achieve these and other advantages and in accordance with the purpose of the present invention, according to a different embodiment, a method of performing paging, which is performed by a first D2D UE in a wireless communication system supporting a device to device (D2D) communication includes the steps of obtaining information on a paging slot, the paging slot is designated for the first D2D UE only and contains a plurality of paging intervals for the D2D communication, transmitting a signal for a second D2D UE via a region assigned for the second D2D UE in a first paging interval in the obtained paging slot, transmitting a paging request message in a paging region dedicated to the second D2D UE in a second paging interval and receiving a paging response message from the second D2D UE, which has received the paging request message, via a third paging interval in response to the paging request message.

To further achieve these and other advantages and in accordance with the purpose of the present invention, according to one embodiment, a first D2D UE performing paging in a wireless communication system supporting a device to device (D2D) communication includes a processor configured to obtain information on a paging slot, the paging slot is designated for the first D2D UE only and contains a plurality of paging intervals for the D2D communication, the processor configured to monitor whether a signal for the first D2D UE is transmitted via a region assigned for the first D2D UE in a first paging interval in the obtained paging slot, the processor, if the signal is detected, configured to monitor whether a paging request message is transmitted in a paging region dedicated to the first D2D UE in a second paging interval and a transmitter, if the paging request message is detected, configured to transmit a paging response message to a second D2D UE, which has transmitted the paging request signal, via a third paging interval in response to the paging request message. The first D2D UE can further include a receiver configured to receive the information on the paging slot designated for the first D2D UE only from a base station via a broadcast message, a multicast message or a unicast message.

The processor can obtain the information on the paging slot designated for the first D2D UE only in a manner of determining an index of the paging slot based on a time unit index to which the first D2D UE is assigned in a discovery interval and a number of paging slots contained between D2D discovery slots. Or, the processor can obtain the information on the paging slot designated for the first D2D UE only in a manner of determining an index of the paging slot based on a paging slot offset value and a number of slots contained between D2D discovery slots.

The paging request message includes an identifier of the first D2D UE transmitting the paging request message, a candidate connection identifier (CID) list or a candidate link identifier (LID) list and the paging response message can include a CID or an LID selected from the candidate CID list or the candidate LID list. The processor performs a connection establishment based on the selected CID or the LID and directly transceive data with the second D2D UE, which has transmitted the paging request message.

To further achieve these and other advantages and in accordance with the purpose of the present invention, according to a different embodiment, a first D2D UE performing paging in a wireless communication system supporting a device to device (D2D) communication includes a processor configured to obtain information on a paging slot, the paging slot is designated for the first D2D UE only and contains a plurality of paging intervals for the D2D communication, a transmitter configured to transmit a signal for a second D2D UE via a region assigned for the second D2D UE in a first paging interval in the obtained paging slot and transmit a paging request message in a paging region dedicated to the second D2D UE in a second paging interval and a receiver configured to receive a paging response message from the second D2D UE, which has received the paging request message, via a third paging interval in response to the paging request message.

Advantageous Effects

According to embodiments of the present invention, utilization efficiency of a system resource is enhanced in a D2D communication system, thereby increasing system performance.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a flowchart for a method of paging in a network coordinated paging procedure.

BEST MODE

Mode For Invention

Figure 1:
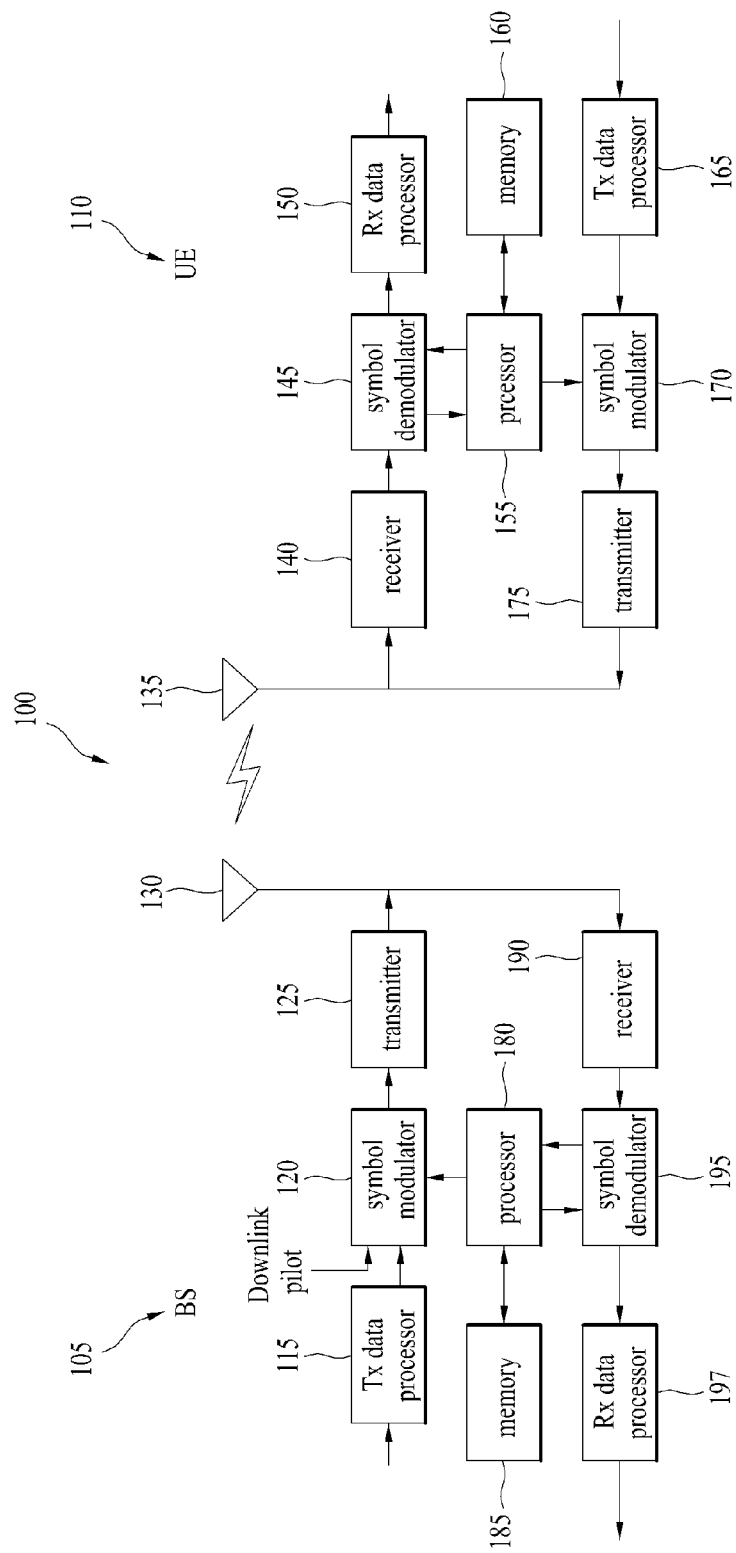
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In the following description, various embodiments for a user equipment to perform a device-to-device communication (hereinafter named a D2D communication or a D2D direct communication) are explained. In describing a D2D communication, 3GPP LTE/LTE-A is taken as an example for the detailed description. Moreover, the D2D communication is applicable to other communication systems (e.g., IEEE 802.16, WiMAC, etc.).

In the present specification, for clarity of the description, a user equipment supportive of a D2D communication (i.e., a device-to-device direct communication) or a user equipment capable of performing the D2D communication shall be named a D2D user equipment. In case that a transmitting end and a receiving end need to be discriminated from each other, a D2D user equipment transmitting or attempting to transmit data to a different D2D user equipment using a radio resource given to a D2D link on performing a D2D communication shall be named a transmitting D2D user equipment. And, a user equipment receiving or attempting to receive the data from the transmitting D2D user equipment shall be named a receiving D2D user equipment. If a plurality of receiving D2D user equipments receiving or attempting to receive data from a transmitting D2D user equipment exist, a plurality of the receiving D2D user equipments can be identified from each other using ordinal numbers including '1st to Nth'. Moreover, for clarity of the following description, such a random node at a network end as a base station configured to control a connection between D2D user equipments or allocate a radio resource to a D2D link, a D2D server, a connection/session management server and the like shall be named 'network'.

Figure 2:
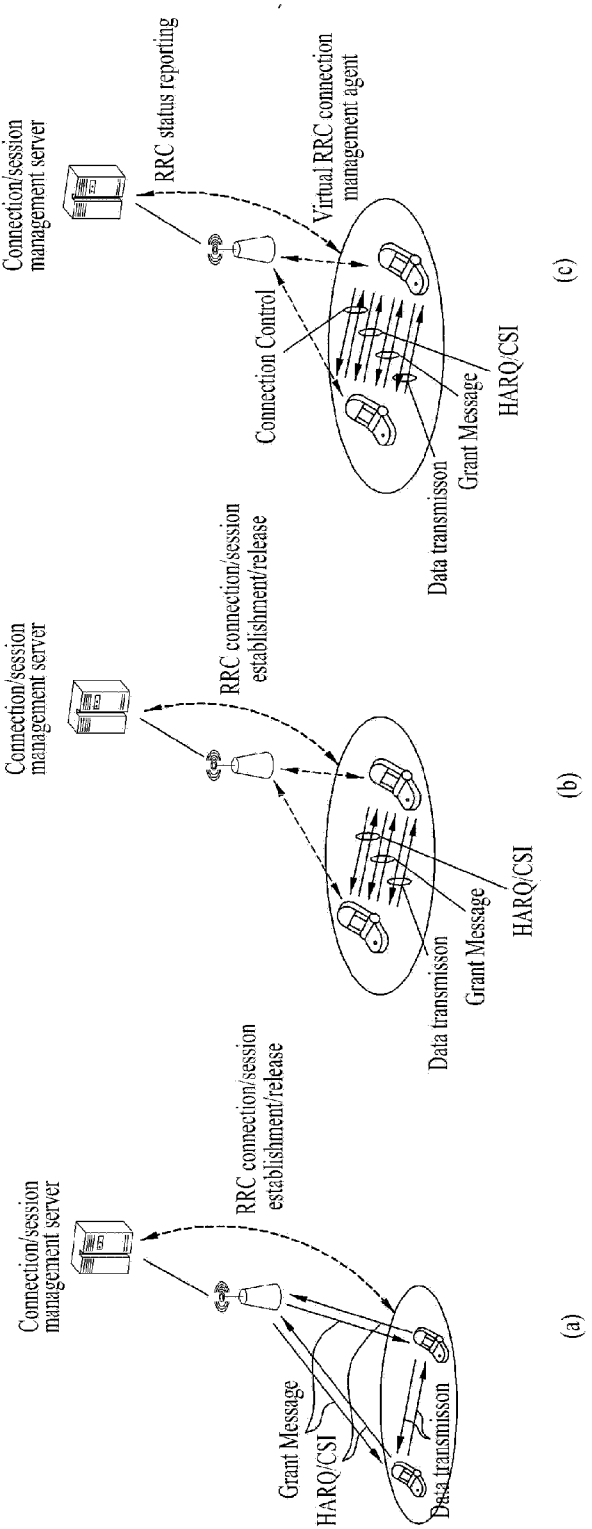
FIG. 2a and FIG. 2b are diagrams for explaining examples of a network concentrated D2D communication type corresponding to a network cooperative D2D communication type and a distributed D2D communication type, respectively.
FIG. 2c is a diagram for explaining an example of a concept of an autonomous D2D communication type.

FIG. 2 is a diagram for examples to describe various embodiments of a D2D communication.

D2D communication can be sorted into a network coordinated D2D communication type or an autonomous D2D communication type depending on a presence or non-presence of performing the D2D communication under the control of a network. The network coordinated D2D communication can be further sorted into a data-only-in-D2D type or a connection-control-only-in-network type depending on a level of network involvement. For clarity of the description, the data-only-in-D2D type shall be named 'network centralized D2D communication type' and the connection-control-only-in-network type shall be named 'distributive D2D communication type'.

FIG. 2 (a) and FIG. 2 (b) are diagrams for examples to describe a network centralized D2D communication type and a distributive D2D communication type in accordance with a network coordinated D2D communication type, respectively.

According to the network centralized D2D communication type shown in FIG. 2 (a), only data are exchanged between D2D user equipments, while a connection control between D2D user equipments and a radio resource allocation (grant message) are performed by a network. The D2D user equipments can transceive data or specific control information using a radio resource allocated by the network.

For instance, HARQ ACK/NACK feedback for a data reception between D2D user equipments or channel state information (CSI) can be transmitted to another D2D user equipment through a network instead of being directly exchanged between the D2D user equipments. In particular, if a network establishes a D2D link between D2D user equipments and allocates a radio resource to the established D2D link, a transmitting D2D user equipment and a receiving D2D user equipment are able to perform a D2D communication using the allocated radio resource.

Namely, according to the network centralized D2D communication type, a D2D communication between D2D user equipments is controlled by a network. And, the D2D user equipments are able to perform the D2D communication using a radio resource allocated by the network.

According to the distributive D2D communication type shown in FIG. 2 (b), a network performs a role more limited than that of a network according to the network centralized D2D communication type. According to the distributive D2D communication type, a network performs a control of connection between D2D user equipments. Yet, a radio resource allocation (grant message) between the D2D user equipments can be occupied by the D2D user equipments through contentions between the D2D user equipments without the help of the network.

For instance, HARQ ACK/NACK feedback for a data reception between D2D user equipments or channel state information can be directly exchanged between the D2D user equipments without passing through a network.

As mentioned in the foregoing description of the example, a D2D communication can be sorted into a network centralized D2D communication type or a distributive D2D communication type depending on a level of network D2D communication involvement. In this case, a common feature between the network centralized D2D communication type and the distributive D2D communication type lies in that a D2D connection control can be performed by a network.

In particular, according to a network coordinated D2D communication type, a network can establish a connection between D2D user equipments by establishing a D2D link between the D2D user equipments attempting to perform a D2D communication. In establishing the D2D link between the D2D user equipments, the network can give a physical D2D link identifier (LID) to the established D2D link. In this case, when a plurality of D2D links exist between a plurality of D2D user equipments, the physical D2D ink identifier can be used as an identifier for identifying each of the D2D links.

FIG. 2 (c) is a diagram for one example to describe a concept of an autonomous D2D communication type.

According to an autonomous D2D communication type, unlike a network centralized or distributive D2D communication type, D2D user equipments can freely perform a D2D communication without the help of a network. In particular, according to the autonomous D2D communication type, unlike the network centralized or distributive D2D communication type, a connection control, a radio resource occupation and the like can be autonomously performed by a D2D user equipment. If necessary, the network may provide the D2D user equipment with D2D channel information available for a corresponding cell.

Based on a frame structure mentioned in the following description, the autonomous D2D communication type shall be described in detail as follows.

Figure 3:
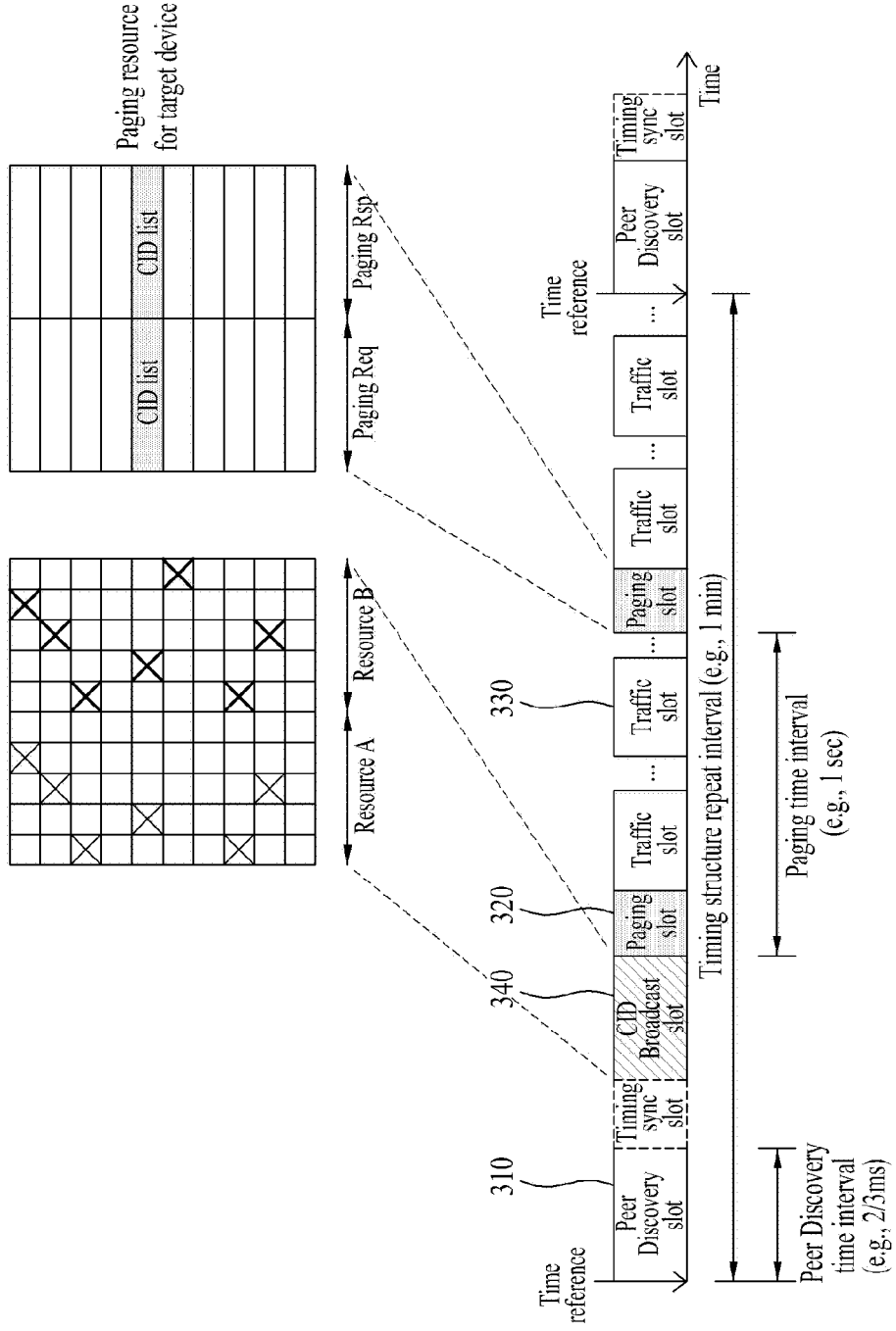
FIG. 3 is a diagram for an example of a frame structure applicable to an autonomous D2D communication type.

FIG. 3 is a diagram for one example of a frame structure applicable to an autonomous D2D communication type.

First of all, according to an autonomous D2D communication type, a D2D user equipment may be able to perform a D2D communication using a frame shown in FIG. 3 for example. Like the example shown in FIG. 3, a frame applicable to an autonomous D2D communication type may include a peer discovery slot 310, a paging slot 320 and a traffic slot 330. In some cases, the frame applicable to the autonomous D2D communication type may further include a CID (connection identification) broadcast slot 340.

The peer discovery slot 310 is an interval provided to enable a D2D user equipment to detect a different D2D user equipment nearby and broadcast its presence to the different D2D user equipment nearby. A single peer discovery slot 310 includes a plurality of logical channels. The D2D user equipment can share the peer discovery slot 310 with a different D2D user equipment through broadcasting and listening. In particular, the D2D user equipment listens to a logical channel occupied by the different D2D user equipment from the different D2D user equipment nearby, thereby being able to recognize that a specific one of a plurality of the logical channels of the peer discovery slot 310 is currently used or that a specific one of a plurality of the logical channels is vacant. In some cases, a broadcast listening available range of a D2D user equipment may be limited to a neighbor D2D user equipment within 1 hop centering on itself. Yet, the listening available range of the D2D user equipment needs not to be necessarily limited to the neighbor D2D user equipment within 1 hop.

Having listened to a logical channel occupied by a different D2D user equipment from a different D2D user equipment nearby, the D2D user equipment is able to randomly select one of vacant logical channels of the 1st peer discovery slot 310. Subsequently, the D2D user equipment is able to broadcast a peer discovery signal for announcing the logical channel selected by the D2D user equipment on the selected logical channel through a next peer discovery slot. A process for the D2D user equipment to broadcast the peer discovery signal is described in detail with reference to FIG. 4 as follows.

Figure 4:
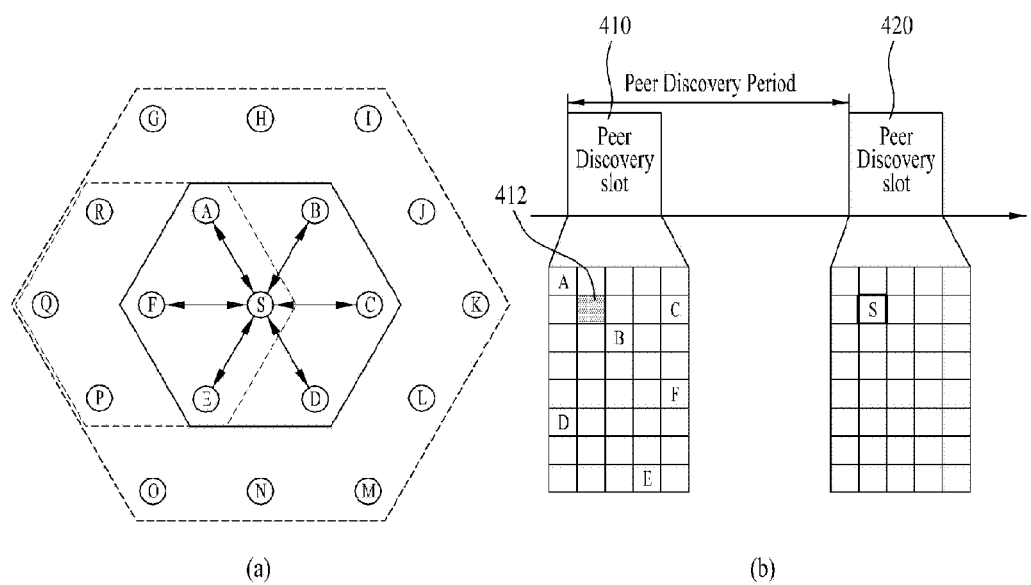
FIG. 4 is a diagram for explaining an example for a D2D UE to broadcast a peer discovery signal.

FIG. 4 is a diagram for one example to describe that a D2D user equipment broadcasts a peer discovery signal.

First of all, like the example shown in FIG. 4 (a), assume that a D2D user equipments A (denoted by A) to a D2D user equipment R (denoted by R) exist around a D2D user equipment S (denoted by S). In this case, assume that the D2D user equipment A to the D2D user equipment F (denoted by F) are neighbor user equipments located within 1 hop with reference to the D2D user equipment S. And, assume that the D2D user equipment G (denoted by G) to the D2D user equipment R are neighbor user equipments located within 2 hops with reference to the D2D user equipment S.

In the environment shown in FIG. 4 (a), if a D2D user equipment is able to listen to a broadcast from a neighbor D2D user equipment within 1 hop, the D2D user equipment S may be able to listen to a logical channel occupied by the D2D user equipments A to F in a 1st peer discovery slot 410. Having listened to the logical channel occupied by the D2D user equipments A to F, the D2D user equipments can randomly select one of logical channels vacant in the peer discovery slot based on the listened broadcast [e.g., in FIG. 4 (b), a logical channel denoted by '412' is selected]. Thereafter, like the example shown in FIG. 4 (b), the D2D user equipment S (denoted by S) can broadcast a peer discovery signal using the logical channel randomly selected from a 2nd peer discovery slot 420.

Each of the D2D user equipments A to F listening to the logical channel selected by the D2D user equipment S is able to detect a presence or non-presence of collision of the logical channel selected by the D2D user equipment S. For instance, when the D2D user equipment F listens to the broadcasts from the D2D user equipments A, E and P to R, the D2D user equipment F is able to detect whether the logical channel selected by the D2D user equipment S collides with a logical channel of each of the D2D user equipments A, E and P to R. In case that the logical channel selected by the D2D user equipment S collides with the logical channel of the D2D user equipment Q, the D2D user equipment F transmits a notification signal notifying that the logical channel collision has been detected to the D2D user equipment S. Subsequently, the D2D user equipment S is then able to select a new logical channel in accordance with the notification signal.

On the other hand, if the logical channel selected by the D2D user equipment S avoids the collision, the D2D user equipment can keep broadcasting the peer discovery signal through the selected logical channel.

If the D2D user equipment F determines the collision with the logical channel occupied by the neighbor D2D user equipment Q, the D2D user equipment F transmits a notification signal notifying the detection of the collision to the D2D user equipment S so that the D2D user equipment S can select a new logical channel.

The CID broadcast slot 340 shown in FIG. 3 is provided to enable a D2D user equipment to listen to a CID currently used by a different D2D user equipment and to broadcast a CID currently used by itself. In particular, in order to announce a CID currently used by itself or a CID desired to be used by itself, the D2D user equipment is able to broadcast a CID broadcast signal through a CID resource of the CID broadcast slot 340. The D2D user equipment is able to set a CID to use through the paging slot 320 mentioned in the following description.

The paging slot 320 shown in FIG. 3 is provided to configure a CID between a transmitting D2D user equipment and a receiving D2D user equipment. The paging slot 320 for configuring the CI may include a paging request interval and a paging response interval. For the CID configuration between the transmitting D2D user equipment and the receiving D2D user equipment, one of the transmitting D2D user equipment and the receiving D2D user equipment operates as a paging initiator user equipment and the other can operate as a paging target user equipment.

The paging initiator user equipment is able to create a 1st CID list containing at least one of vacant broadcast resources (i.e., unused CIDs) based on a CID listened to through the CID broadcast slot 340. Once the 1st CID list is created, the paging initiator user equipment can transmit the 1st CID list to the paging target user equipment using a paging resource of the paging initiator user equipment or a paging resource of the paging target user equipment.

In this case, the paging resource can be determined by a device identifier (Device ID) of the paging initiator user equipment or the paging target user equipment. A paging resource between D2D user equipments may be identifies by time-frequency or orthogonal code, by which the paging resource may be non-limited.

In the paging response interval, the paging target user equipment creates a 2nd CID list containing at least one vacant broadcast resource based on a CID listened to through its own CID broadcast slot 340 and is then able to transmit the 2nd CID list to the paging initiator user equipment using its own paging resource or a paging resource of the paging initiator user equipment.

Each of the paging initiator user equipment and the paging target user equipment selects an available CID candidate group based on the 1st CID list and the 2nd CID list, selects a prescribed CID from the available CID candidate group, and is then able to broadcast a CID broadcast signal through a CID resource of the CID broadcast slot 440 in order to announce the selected CID.

Thereafter, each of the paging initiator user equipment and the paging target user equipment is able to determine whether the selected CID is currently used by a different D2D user equipment through a next CID broadcast slot 340. In particular, each of the paging initiator user equipment and the paging target user equipment is able to determine whether the selected CID is currently used by comparing signal strengths for the same tone of different CID resources.

If it is determined that the selected CID is currently used, each of the paging initiator user equipment and the paging target user equipment is able to select a different CID. Otherwise, if it is determined that the selected CID is not currently used, each of the paging initiator user equipment and the paging target user equipment is able to activate the selected CID. Only if both of the paging initiator user equipment and the paging target user equipment activate the selected CID, the selected CID can be configured as a CID between the paging initiator user equipment and the paging target user equipment.

Unlike the network centralized D2D communication type or the distributive D2D communication type, a D2D user equipment in the autonomous D2D communication type autonomously performs a control of a connection to a different D2D user equipment. Hence, according to the autonomous D2D communication type, a D2D link ID cannot be assigned by a network. According to the autonomous D2D communication type, a D2D user equipment is able to perform a D2D communication by configuring a CID with a different D2D user equipment through the paging slot 320 instead of receiving assignment of a D2D link ID.

Once the CID configuration between the transmitting D2D user equipment and the receiving D2D user equipment is completed through the paging slot 320, the transmitting D2D user equipment and the receiving D2D user equipment can perform a data transceiving using the traffic slot 330. In doing so, the transmitting D2D user equipment and the receiving D2D user equipment can occupy the traffic slot 330 through contention with other D2D link. In case of occupying the traffic slot 330, the transmitting D2D user equipment and the receiving D2D user equipment can transceive data with each other using the occupied traffic slot 330.

A process for the transmitting D2D user equipment and the receiving D2D user equipment to occupy the traffic slot 330 shall be described in detail with reference to FIG. 5 as follows.

Figure 5:
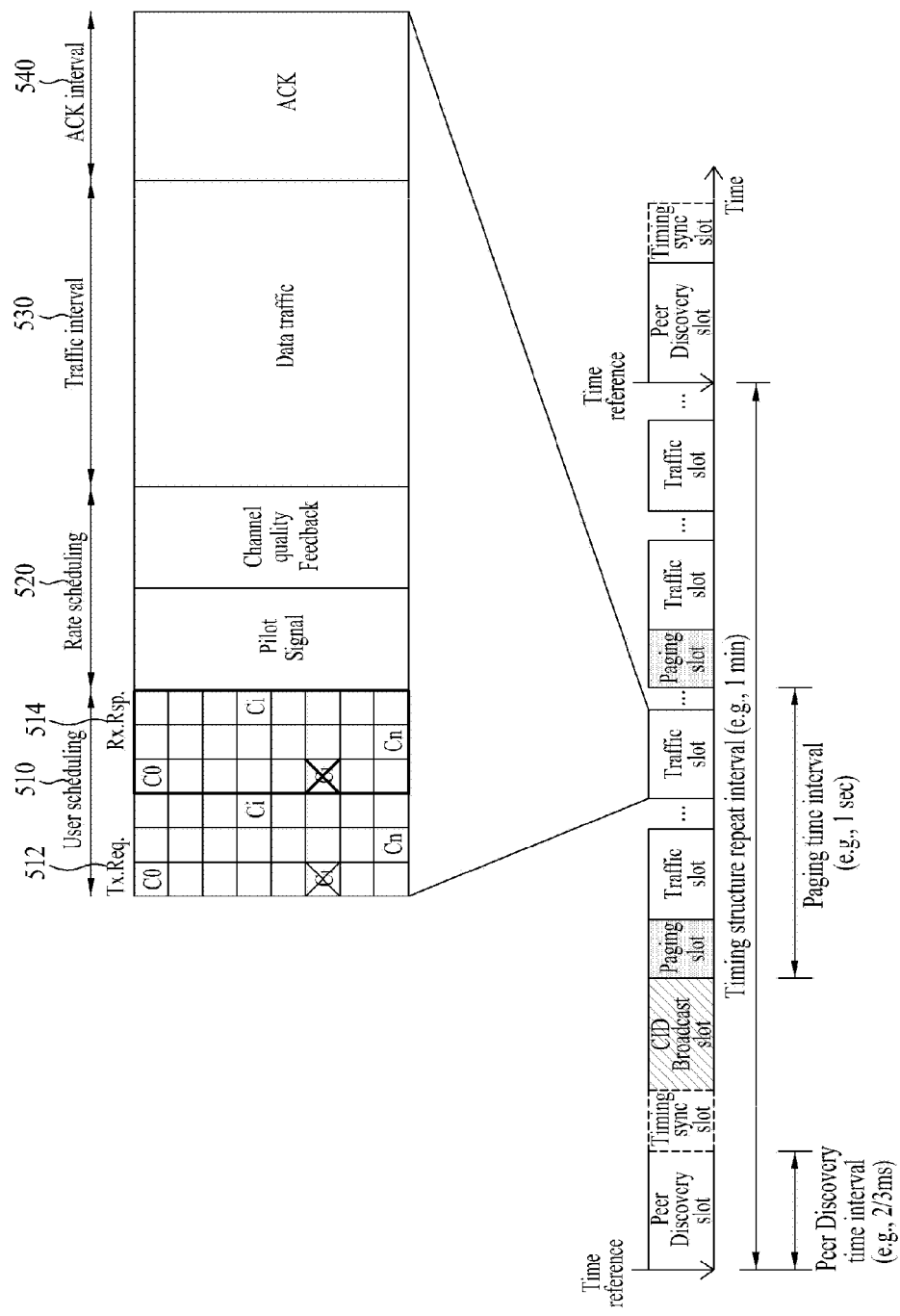
FIG. 5 is a diagram for explaining an example of a process for a transmission D2D UE and a reception D2D UE to occupy a traffic slot.

FIG. 5 is a diagram for one example to describe a process for a transmitting D2D user equipment and a receiving D2D user equipment to occupy a traffic slot.

Referring to FIG. 5, the traffic slot 330 can include a user scheduling interval 510, a rate scheduling interval 520, a traffic interval 530 and an ACK interval 540.

The user scheduling interval 510 is provided to transceive a signal for the transmitting D2D user equipment and the receiving D2D user equipment to occupy the corresponding traffic slot 330. And, the user scheduling interval may include a transmission request interval (Tx Req) 512 and a reception response interval (Rx Res) 514. First of all, in the transmission request interval 512, the transmitting D2D user equipment is able to transmit a request signal to the receiving D2D user equipment through a resource corresponding to a selected CID using the CID selected through the paging slot 320.

The receiving D2D user equipment, which shares the same CID with the transmitting D2D user equipment, receives the request signal. If the receiving D2D user equipment determines that a data transmission is possible by a preset contention rule, the receiving D2D user equipment is able to transmit a response signal to the transmitting D2D user equipment through a resource corresponding to the CID in the response interval 514.

The receiving D2D user equipment having received the request signal successfully and the transmitting D2D user equipment having received the response signal successfully can determine that the corresponding traffic slot 330 is occupied. In case of determining that the traffic slot 330 is occupied, the transmitting D2D user equipment can transmit a pilot signal (or a reference signal) to the receiving D2D user equipment in the rate scheduling interval 520. Having received the pilot signal from the transmitting D2D user equipment, the receiving D2D user equipment can obtain a channel state for the pilot signal. In particular, the receiving D2D user equipment obtains a channel state (e.g., CQI (channel quality information), CSI (channel state information), SNR (signal to interference plus noise to ratio), etc.) and is then able to feed back the obtained channel state to the transmitting D2D user equipment having transmitted the pilot signal.

Having received the channel state from the receiving D2D user equipment, the transmitting D2D user equipment can determine whether to transmit data to the receiving D2D user equipment using a D2D traffic resource in the traffic interval 530. For instance, if a measured CQI or SINR is smaller or lower than a preset threshold, the transmitting D2D user equipment does not transmit the data in the traffic interval but is able to attempt an occupation of a next traffic slot 330.

If the transmitting D2D user equipment transmits the data using the traffic resource in the traffic interval 530, the receiving D2D user equipment is able to transmit ACK or NACK depending on a presence or non-presence of a successful data reception in the response interval 540.

In general, terminologies used for the description of the present invention can be used as the following meanings.

First of all, Link ID (LID) is an identifier set for a connection to recognize each user equipment. The LID is an identifier assigned to a physical connection between user equipments and is a unique ID in a specific area. For instance, the LID may include one of STID (station identifier) of IEEE 802.16 system and C-RNTI (cell radio network temporary identifier).

Connection ID (CID) is an identifier assigned to at least one service flow settable between user equipments. For instance, the CID may include one of a connection ID on a MAC layer in IEEE 802.16e system, a flow ID (FLOW ID) on a MAC layer in IEEE 802.16m system, a logical channel ID (LCID) meant in LTE and a DRB identity. In particular, the CID is LCID on a MAC layer or a DRB (data ratio bearer) ID on an ELC layer.

Link ID or Connection ID used by the present invention can be set to a bi-directional or uni-directional ID. In particular, in case of bi-direction, Link/Connection ID set once means that each of two user equipments can play a role as a transmitter or a receiver and data transceived between the two user equipments can use a single Link/Connection ID. Yet, in case of being used as a uni-directional ID, Link/Connection ID set once means that a user equipment having initiated a link or connection operates as a transmitting user equipment (or a source user equipment) and that a target user equipment operates as a receiving user equipment. In case that a target user equipment has data to transmit to a source user equipment, the target user equipment establishes a new Link/Connection and is able to transmit the data using an additional Link/Connection ID.

In case of performing D2D communication, a paging procedure is used for a CID configuration. Once the CID configuration is completed, a connection of the CID configuration monitors a broadcast slot without paging and a D2D user equipment (hereinafter abbreviated D2D UE) checks whether a CID of the D2D UE is continuously valid. Yet, due to a nature of the D2D communication, a resource according to a D2D UE is already set to a current D2D paging slot and D2D UEs should monitor a resource allocated to the D2D UEs. For a resource necessary for making a paging request/response, each D2D UE should be able to transmit one or more candidate CIDs. Hence, sufficient resource capable of transmitting the paging request/response should be allocated to each D2D UE in advance. This may become a cause of an unnecessary system resource waste. Despite a resource is used only when a connection is established, if resources are allocated to all D2D UEs in advance, resource utilization efficiency of a system is degraded.

All D2D UEs should wake up in every paging interval, check whether there is a paging request transmitted to the D2D UEs and monitor a paging resource (paging request) region assigned to the D2D UEs. As mentioned in the foregoing description, if all D2D UEs wake up in every paging interval and check whether there is a paging request transmitted to the D2D UEs, it may become a factor causing power consumption of a user equipment. Methods for solving the degradation of the system resource utilization efficiency and the factor causing power consumption of a user equipment are proposed in the following.

Method of Designating Paging Slot According to D2D UE

The present invention proposes a method of distributing a paging interval according to a D2D UE by designating a paging slot according to a D2D UE. It is necessary for a transmission D2D UE and a reception D2D UE to become aware of paging intervals of all surrounding D2D UEs and paging resource positions for paging.

Method 1. A base station can explicitly inform D2D UEs of a paging interval and a paging resource via broadcast/multicast/unicast message.

Method 2. Unlike a method of informing a paging interval and a paging resource, which is explicitly informed by a base station, a D2D UE is able to know a paging interval via an implicit mapping according to a position to which the D2D UE is assigned in a discovery slot. For instance, the paging interval can be determined as follows.

A paging interval for a D2D UE=a time unit # for the D2D UE in a discovery slot (or subcarrier set #) % N In this case, N may corresponds to the number of paging slots (capable of being obtained by receiving D2D channel information) in one or more timing structure repeat intervals or a random integer value (N>0, received from a base station).

Method 3. Start offset of paging interval

A start offset (value) of a paging interval can be represented by N % Peer ID. In this case, N corresponds to the number of paging intervals in a D2D discovery interval (paging cycle). A D2D UE is able to know a paging interval/resource designated/allocated to the D2D UE according to a start offset value of a paging interval. In particular, a D2D UE is able to calculate the start offset value of the paging interval by performing the calculation (i.e., N % Peer ID) for a Peer ID of the D2D UE and the number of paging intervals in a D2D discovery interval and is able to know a paging interval/resource allocated to the D2D UE according to the calculated offset value. For instance, referring to FIG. 6, if an offset value of a paging interval is calculated by 1, a D2D UE is able to know that a paging slot #1 is assigned to the D2D UE according to the calculated offset value 1.

According to the method 1, having explicitly received signaling from a base station, a D2D UE is able to know not only a paging interval/resource allocated to the D2D UE but also a paging interval/resource allocated to a neighbor D2D UE. According to the method 2, a D2D UE searches for a neighbor D2D UE in a peer discovery slot interval and can detect the neighbor D2D UE. The D2D UE identifies a time unit # to which a signal of the detected neighbor D2D UE is transmitted and may be able to know a paging interval/resource of the neighbor D2D UE. In particular, this indicates that a paging interval/resource of a target UE can be obtained using D2D UE information obtained in the peer discovery slot.

As mentioned in the foregoing description, a D2D UE wakes up in a paging interval assigned to the D2D UE only and performs monitoring. By doing so, power consumption can be reduced.

Figure 6:
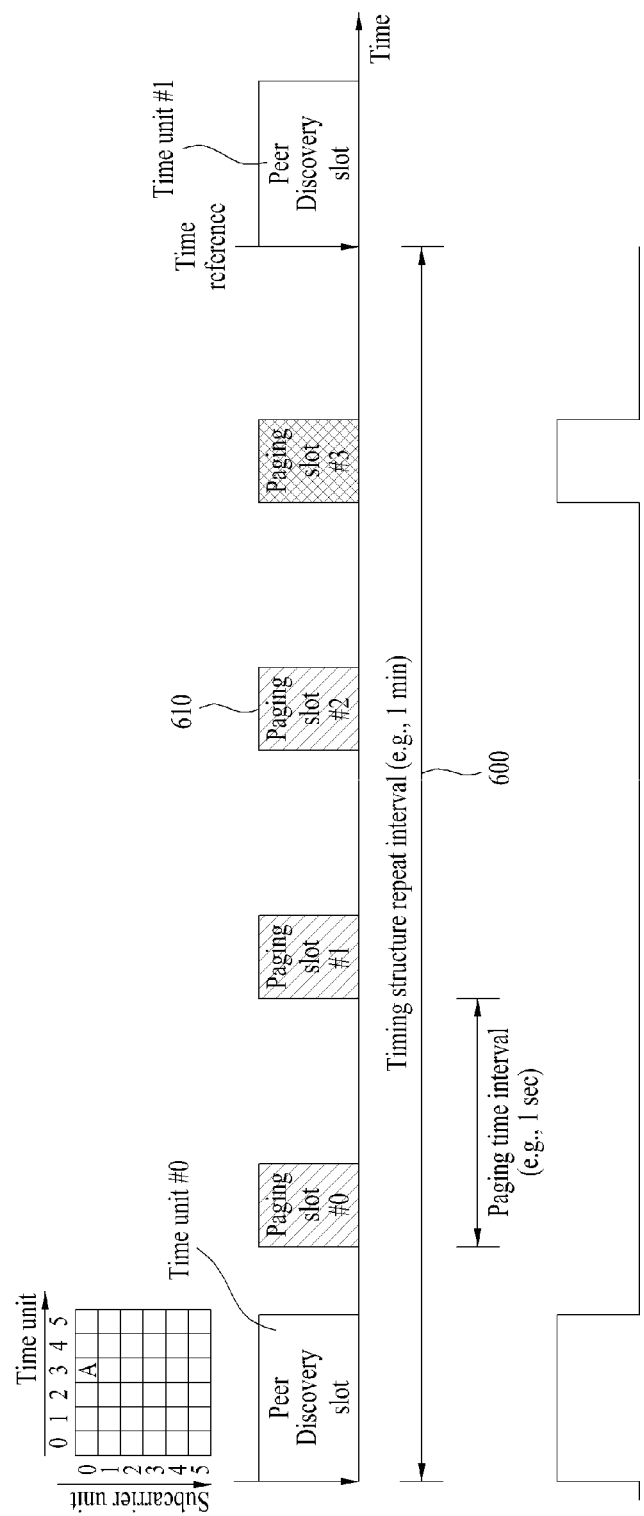
FIG. 6 is a diagram for explaining an example of a method of designating a paging slot according to a D2D UE.

FIG. 6 is a diagram for explaining an example of a method of designating a paging slot according to a D2D UE.

Referring to FIG. 6, 4 paging slots are included in a basic timing structure repeat interval 600 (in FIG. 6, one basic timing structure repeat interval is configured by an interval starting from a point where a first D2D (or peer) discovery slot starts and ending on a point where a second D2D discovery slot starts). Although it is not depicted in FIG. 6, if a paging slot number is calculated using the method 2 under an assumption that a position of a peer discovery slot of a D2D UE A corresponds to time unit #3 and a subcarrier set corresponds to #0, in order for the D2D UE A to monitor a paging signal transmitted to the D2D UE A, the D2D UE A should monitor a paging slot number 3 610 (paging slot number=3% 4=3).

The D2D UE A monitors a $4^{th}$ paging slot (paging slot #3) 610 only. D2D UEs eager to communicate with the D2D UE A identify a position (time unit #3) of the D2D UE A in a discovery slot and transmit paging signals to the D2D UE A via the $4^{th}$ paging slot.

Method of Obtaining Resource for Paging

Figure 7:
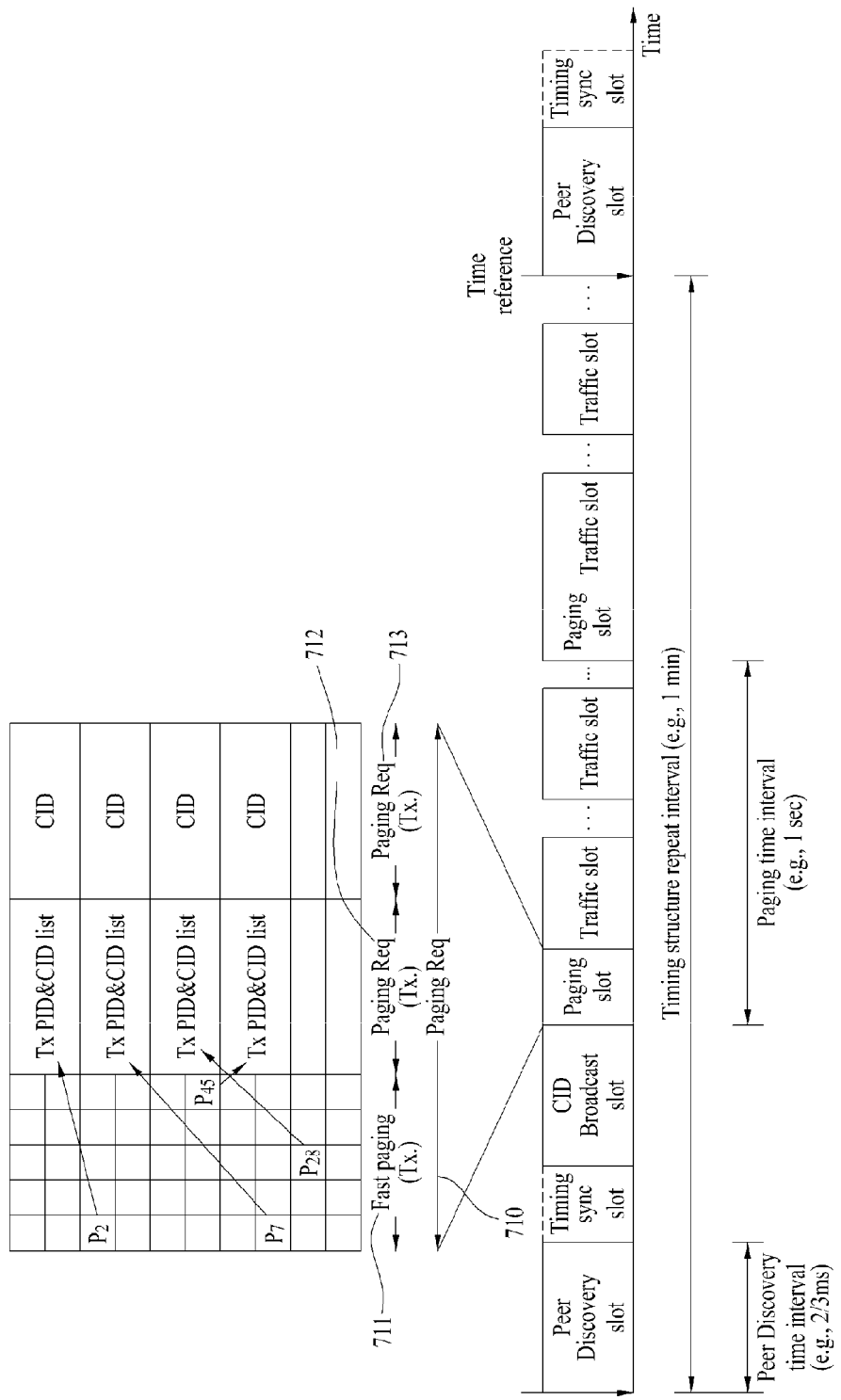
FIG. 7 is a diagram for explaining an example of a method of obtaining a resource for paging.

Paging resource allocation in autonomous D2D system is explained in the following. FIG. 7 is a diagram for explaining an example of a method of obtaining a resource for paging.

Configuration of Paging Interval According to D2D UE

As shown in FIG. 7, a paging slot 710 includes a fast paging interval 711, a paging request interval 712 and a paging response interval 713. First of all, the fast paging interval 711 is explained.

1. Fast Paging (Paging Indication Interval)

A D2D UE (a source D2D UE or a transmission D2D UE) can transmit paging to a target D2D UE in a manner of loading the paging on a single tone corresponding to a peer ID of the target D2D UE. The D2D UE monitors a corresponding fast paging interval only and monitors a paging request/response interval only when there is a signal transmitted to the D2D UE.

2. Paging Request ($i^{th}$ Paging Resource (Max. m))

If a D2D UE detects a signal on a single tone corresponding to a peer ID of the D2D UE, the D2D UE monitors a paging resource region of a paging interval. If the n number of single tone is transmitted in a fast paging interval, the n number of resource as many as the number of the single tone can be sequentially mapped in a paging request region according to a logical ID. Having received a fast paging, the D2D UE monitors a paging resource region of the D2D UE only to identify whether a paging request signal is transmitted. Peer ID information of a source D2D UE (or a transmission D2D UE) is transmitted to a corresponding resource. In this case, a candidate CID (or an LID list) is transmitted together with the peer ID information.

3. Paging Response ($i^{th}$ Paging Resource (Max. m), in this Case, m May be Equal to or Less than the Number of Resource of a Fast Paging (the Number of Total Single Tone))

A target D2D UE transmits a CID or an LID selected from the candidate CID or the LID list, which is included in the received paging request message, to a source D2D UE which has transmitted the paging request message.

The source D2D UE (or a transmission D2D UE) performs a connection establishment with the target D2D UE using the selected CID or the LID and may be then able to directly exchange a signal or data with the target D2D UE without passing through a base station.

Method of Paging in Network Coordinated Paging Procedure

FIG. 8 is a flowchart for a method of paging in a network coordinated paging procedure.

A D2D discovery procedure can be performed by an autonomous or a network coordinated method. In case of performing a paging procedure by the network coordinated method, a D2D UE A ("A" in FIG. 8) may ask a base station (BS) to connect the D2D UE A with a target D2D UE B ("B" in FIG. 8). The aforementioned method can be performed by a procedure described in the following.

Method for a Network to Assign a CID or an LID to Two D2D UEs

A D2D UE A selects a D2D UE B from neighboring D2D UEs via a discovery process (e.g., an autonomous or a network coordinated) [S810]. If the network randomly selects a counterpart D2D UE B, the network can transmit a message (D2D_PAG-CMD (B)) to the D2D UE A indicating that the network is going to page the D2D UE B. The D2D UE A can transmit a paging request message (e.g., D2D_PAG-REQ) to a base station [S820]. The paging request message can be transmitted to the base station in a manner of including a target D2D UE (e.g., a peer ID of the target D2D UE), a CID not used by neighboring UEs or a LID list. Yet, in case that the base station manages CID/LID and randomly selects the D2D UE B, transmission of the paging request message transmitted by the D2D UE A can be omitted.

Subsequently, the base station can deliver the paging request message (e.g., D2D_PAG-REQ) to the D2D UE B which is a target D2D UE [S830]. The paging request message can include a source D2D UE ID (e.g., a peer ID) (in this case, an ID of the D2D UE A). The D2D UE B can transmit a paging response message (e.g., D2D_PAG-RSP message) to the base station [S840]. The base station can transmit information on a result of acceptance or rejection for a source D2D UE (the D2D UE A), a CID not used by neighboring UEs or an LID list to the D2D UE A and the D2D UE B, respectively, and the base station can assign a CID or an LID for D2D communication to the D2D UE A and the D2D UE B [S850].

Subsequently, the D2D UE A and the D2D UE B perform a direct link communication between the D2D UEs via the assigned CID or the LID [S860]. In particular, the D2D UE A and the D2D UE B can exchange a signal and data with each other between the D2D UEs via the assigned CID or the LID.

As mentioned in the foregoing description, according to embodiment of the present invention, if a paging procedure configured to be performed for a D2D communication is performed in a different paging interval according to a D2D UE, power consumption of D2D UEs is minimized and a paging resource is allocated to a D2D UE performing paging only. By doing so, power of the D2D UE can be saved and system resource utilization efficiency can be enhanced.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transmitting a signal, which is transmitted a D2D UE in a wireless communication system supporting D2D (device to device) communication, can be industrially applied to various mobile communication systems including 3GPP LTE, LTE-A system, IEEE 802 and the like.

What is claimed is:

1. A method of performing paging by a first D2D UE in a wireless communication system supporting a device to device D2D communication, the method comprising:
   obtaining information on a paging slot, the paging slot is designated for the first D2D UE only and contains a plurality of paging intervals for the D2D communication;
   monitoring whether a signal for the first D2D UE is transmitted via a region assigned for the first D2D UE in a first paging interval in the obtained paging slot;
   if the signal is detected, monitoring whether a paging request message is transmitted in a paging region dedicated to the first D2D UE in a second paging interval; and
   if the paging request message is detected, transmitting a paging response message to a second D2D UE, which has transmitted the paging request signal, via a third paging interval in response to the paging request message.

2. The method of claim 1, further comprising:
   receiving the information on the paging slot designated for the first D2D UE only from a base station via a broadcast message, a multicast message or a unicast message.

3. The method of claim 1, wherein the step of obtaining the information on the paging slot designated for the first D2D UE only further comprising determining an index of the paging slot based on a time unit index to which the first D2D UE is assigned in a discovery interval and a number of paging slots contained between D2D discovery slots.

4. The method of claim 1, wherein the step of obtaining the information on the paging slot designated for the first D2D UE only further comprising determining an index of the paging slot based on a paging slot offset value and a number of slots contained between D2D discovery slots.

5. The method of claim 1, wherein the paging request message comprises an identifier of the first D2D UE transmitting the paging request message, a candidate connection identifier (CID) list or a candidate link identifier (LID) list and wherein the paging response message comprises a CID or an LID selected from the candidate CID list or the candidate LID list.

6. The method of claim 5, further comprising the steps of:
   performing a connection establishment based on the selected CID or the LID; and
   directly transceiving data with the second D2D UE, which has transmitted the paging request message.

7. The method of claim 1, wherein the second paging interval corresponds to a paging request interval and wherein the third paging interval corresponds to a paging response interval.

8. The method of claim 1, wherein the first paging interval corresponds to a fast paging interval and wherein the region assigned for the first D2D UE corresponds to a single tone corresponding to an identifier of the first D2D UE.

9. A method of performing paging by a first D2D UE in a wireless communication system supporting a device to device (D2D) communication, the method comprising:
   obtaining information on a paging slot, the paging slot is designated for the first D2D UE only and contains a plurality of paging intervals for the D2D communication;
   transmitting a signal for a second D2D UE via a region assigned for the second D2D UE in a first paging interval in the obtained paging slot;
   transmitting a paging request message in a paging region dedicated to the second D2D UE in a second paging interval; and
   receiving a paging response message from the second D2D UE, which has received the paging request message, via a third paging interval in response to the paging request message.

10. A first D2D UE for performing paging in a wireless communication system supporting a D2D (device to device) communication, the first D2D UE comprising:
    a processor configured to obtain information on a paging slot, the paging slot is designated for the first D2D UE only and contains a plurality of paging intervals for the D2D communication, the processor configured to monitor whether a signal for the first D2D UE is transmitted via a region assigned for the first D2D UE in a first paging interval in the obtained paging slot, the processor, if the signal is detected, configured to monitor whether a paging request message is transmitted in a paging region dedicated to the first D2D UE in a second paging interval; and
    a transmitter, if the paging request message is detected, configured to transmit a paging response message to a second D2D UE, which has transmitted the paging request signal, via a third paging interval in response to the paging request message.

11. The first D2D UE of claim 10, further comprising:
    a receiver configured to receive the information on the paging slot designated for the first D2D UE only from a base station via a broadcast message, a multicast message or a unicast message.

12. The first D2D UE of claim 10, wherein the processor is configured to obtain the information on the paging slot designated for the first D2D UE only in a manner of determining an index of the paging slot based on a time unit index to which the first D2D UE is assigned in a discovery interval and a number of paging slots contained between D2D discovery slots.

13. The first D2D UE of claim 10, wherein the processor is configured to obtain the information on the paging slot designated for the first D2D UE only in a manner of determining an index of the paging slot based on a paging slot offset value and a number of slots contained between D2D discovery slots.

14. The first D2D UE of claim 10, wherein the paging request message comprises an identifier of the first D2D UE transmitting the paging request message, a candidate connection identifier (CID) list or a candidate link identifier (LID) list and wherein the paging response message comprises a CID or an LID selected from the candidate CID list or the candidate LID list.

15. The first D2D UE of claim 14, wherein the processor is configured to perform a connection establishment based on the selected CID or the LID and directly transceive data with the second D2D UE, which has transmitted the paging request message.

16. A first D2D UE for performing paging in a wireless communication system supporting a D2D (device to device) communication, the first D2D UE comprising:
a processor configured to obtain information on a paging slot, the paging slot is designated for the first D2D UE only and contains a plurality of paging intervals for the D2D communication;
a transmitter configured to transmit a signal for a second D2D UE via a region assigned for the second D2D UE in a first paging interval in the obtained paging slot and transmit a paging request message in a paging region dedicated to the second D2D UE in a second paging interval; and
a receiver configured to receive a paging response message from the second D2D UE, which has received the paging request message, via a third paging interval in response to the paging request message.

* * * * *